Aug. 19, 1941.  S. P. SASHOFF  2,253,351
ENERGY TRANSLATING APPARATUS
Filed Dec. 15, 1931  2 Sheets-Sheet 1

WITNESSES:
Arthur J. McMahon
Hymen Diamond

INVENTOR
Stephan P. Sashoff
BY F. W. Lyle.
ATTORNEY

Aug. 19, 1941.   S. P. SASHOFF   2,253,351
ENERGY TRANSLATING APPARATUS
Filed Dec. 15, 1931   2 Sheets-Sheet 2
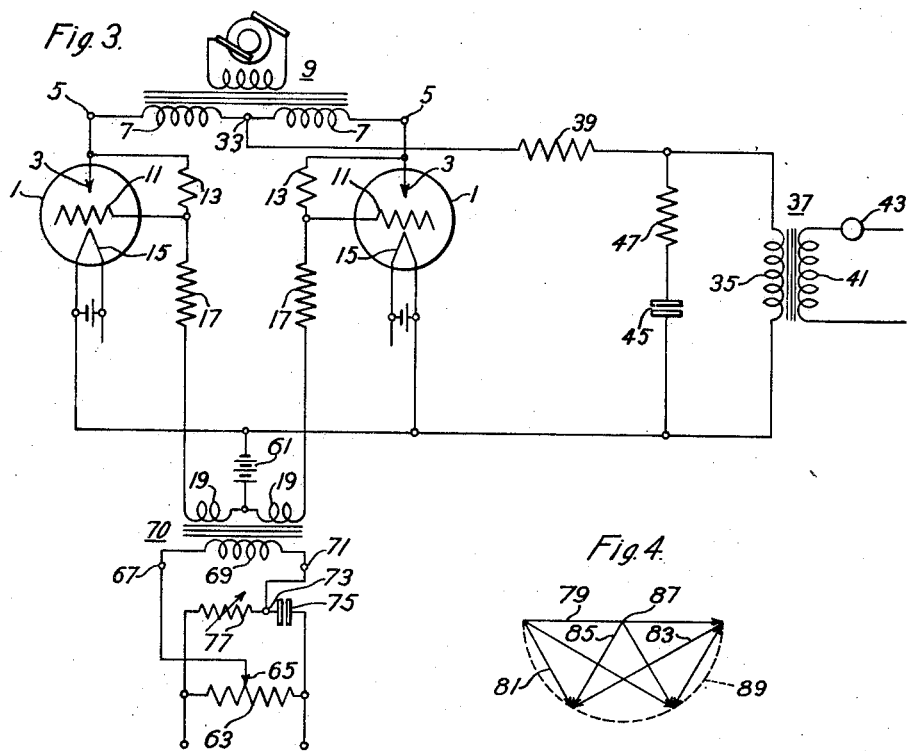
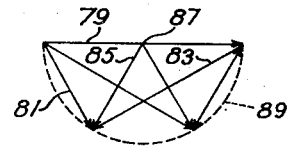
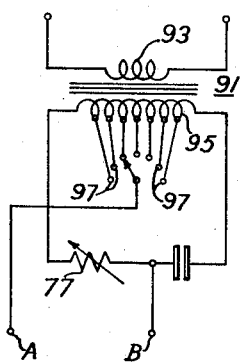
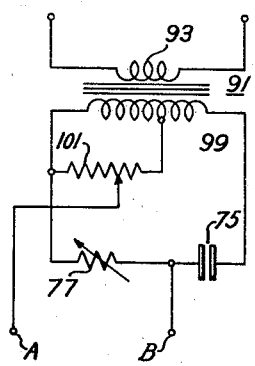
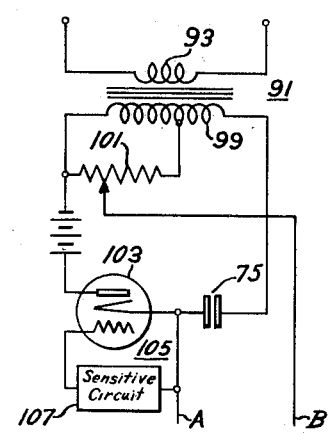
WITNESSES:
INVENTOR
Stephan P. Sashoff
BY
ATTORNEY Patented Aug. 19, 1941

2,253,351

UNITED STATES PATENT OFFICE 2,253,351

ENERGY TRANSLATING APPARATUS

Stephan P. Sashoff, Swissvale, Pa., assignor to Westinghouse Electric & Manufacturing Company, a corporation of Pennsylvania Application December 15, 1931, Serial No. 581,169

13 Claims. (Cl. 175—363)

My invention relates to energy-translating apparatus and has particular relation to apparatus of a type incorporating gas-filled electric-discharge devices with control electrodes.

The electric-discharge devices normally utilized in energy-translating apparatus comprise evacuated envelopes in which a plurality of principal electrodes and control electrodes are disposed in a rarified medium. In systems in which considerable power is supplied, the electric-discharge devices incorporate cathodes of the excitable type; preferably hot cathodes if a moderate current is desired and such cold excitable cathodes as a mercury pool if a large current is desired.

The control electrode in each electric discharge device is utilized for starting the discharge in the device and when the tube is deenergized, the control electrode is maintained at such a potential as to block the passage of a current between the principal electrodes. To energize a device of the type incorporated in apparatus related to the present invention, the potential of the control electrode is properly changed and as a result of the change a passage of current takes place between the principal electrodes of the electric discharge device.

Since the output terminals of each electric discharge device are normally connected, at least through an inductor such as the primary of an output transformer, whereby the power generated in the tube system is transferred to the proper energy consumption system, and since actual or effectual capacitors are also normally present in the system, the result of the sudden rush of current between the principal electrodes of an electric discharge device, when the device becomes conductive, is to produce high-frequency oscillations in the system. The effect of the high-frequency oscillations is to render the electric-discharge devices irregular in their operation. The result is that the electric discharge devices in the system become unexpectedly energized when their control electrodes are at potential at which the devices should be deenergized and they become energized when the control electrodes are set for unenergized states of the device. Moreover, at times, the rush of current between the principal electrodes of any electric-discharge device results in a comparatively high potential between its electrodes and in a consequent destruction of the components of the device or circuit in which the device is used.

It is, accordingly, an object of my invention to provide energy-translating apparatus of the type incorporating electric-discharge devices in which the electric-discharge devices shall operate in a uniform and regular manner.

Another object of my invention is to provide for translating apparatus of the type incorporating gas-filled electric-discharge devices a contrivance for eliminating irregularities in the operation of the electric-discharge devices.

Still another object of my invention is to provide for energy-translating apparatus of the type incorporating electric-discharge devices a contrivance for suppressing high-frequency oscillations in the principal circuit of electric-discharge devices when the devices are suddenly changed from a de-energized condition to an energized condition.

A specific object of my invention is to provide for energy-translating apparatus of a type incorporating electric-discharge devices a contrivance for suppressing the deleterious peak currents produced in the circuits incorporated in the system and arising by reason of the activity of the electric-discharge devices.

An incidental object of my invention is to provide for energy translating apparatus of the type incorporating electric-discharge devices a contrivance for both eliminating the irregularities in the operation of the devices and improving the power factor of the system.

More concisely stated, it is an object of my invention to provide for energy-translating apparatus, incorporating electric-discharge devices of the type that are effective in producing high-frequency oscillations in the circuits of the translating system when changing from one condition to another, a contrivance for suppressing the high-frequency oscillations.

In experimenting with apparatus relating to the present invention and in endeavoring to correct for the irregularities in the operation of the electric-discharge devices and for the premature destruction of the devices, I was lead to the conclusion that the difficulties are caused by the high-frequency oscillations produced in the system. I have found that the difficulties may be remedied by connecting a capacitor across the element, or elements, of the system across which the high-frequency potential would necessarily be produced. By so connecting the capacitor, I have found that the difficulties are eliminated. The capacitor, moreover, has the effect of not only suppressing the instability in the operation but also of considerably improving the power factor of the system in which it is utilized.

To dissipate the energy produced in the network thus provided, I have found it feasible to connect a resistor of proper character in the network and a resistor of proper character in series with the network. The resistors when so connected, I have found, have the effect of decreasing the peaks of the currents produced in the system and of consequently increasing the life of the electric-discharge devices utilized.

In the practice of my invention, the output circuits of the electric-discharge device normally feed through the secondary of a suitable transformer, the primary of which is connected in the power supplying circuit. According to my theory of the origin of the difficulties, the high-frequency oscillations produced in the system are principally produced across the secondary of the transformer. I have found that by connecting a capacitor and a resistor in parallel with the secondary, the difficulties are largely eliminated.

It will be understood, of course, that while in solving the problem with which I was confronted, I applied the theory to which I have referred hereinabove, I do not wish to be limited in any way by the theory. Essentially, what I have found is that unstable operation of electric-discharge devices incorporated in energy-translating apparatus relating to the field of my invention may be eliminated by connecting a capacitor across such elements in the system as may be instrumental in generating high-frequencies.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 3 is a diagrammatic view showing another modification of my invention;

Fig. 4 is a vector diagram relating to a system such as is shown in Fig. 3, and

Figure 1:
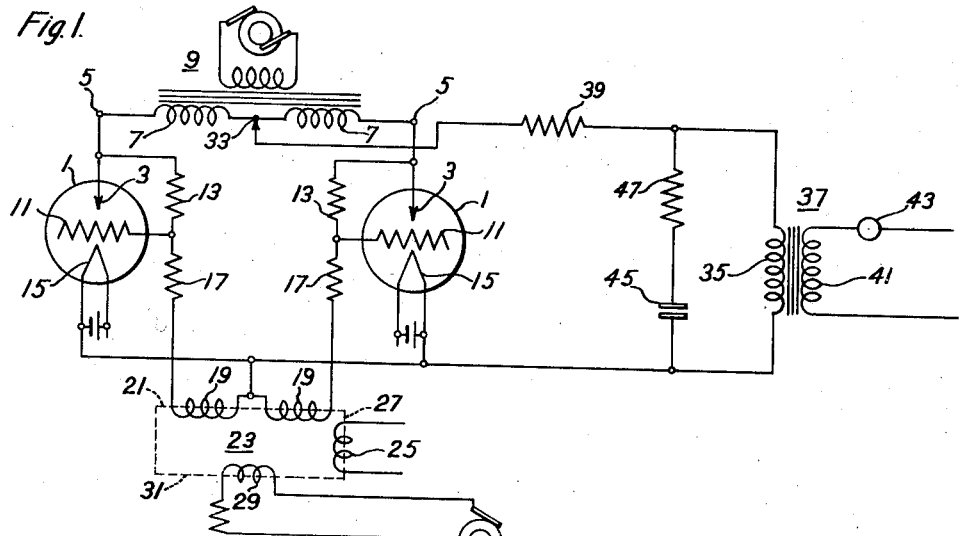
Figure 1 is a diagrammatic view showing an embodiment of my invention.
Figure 2:
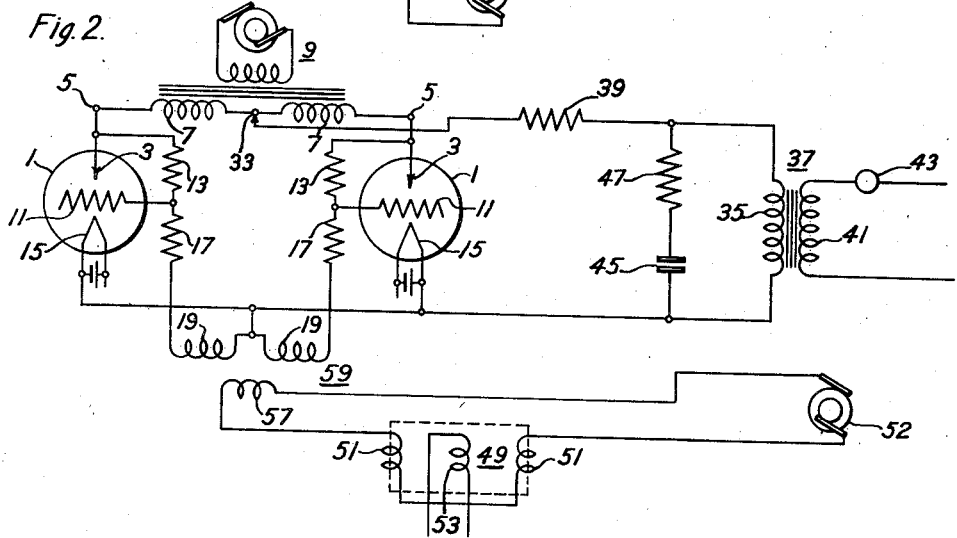
Fig. 2 is a diagrammatic view showing a modification of my invention.

Figs. 5 to 8, inclusive, are diagrammatic views showing elements which may be substituted for certain elements of the systems shown in Figs. 1, 2 and 3.

The apparatus shown in Fig. 1 comprises a plurality of electric-discharge devices 1, the anodes 3 of which are connected to the terminals 5 of the secondary 7 of a center tap transformer 9 provided for the purpose of supplying power to the system. The control electrodes 11 of the electric-discharge devices 1 are connected to the anodes 3 through suitable impedances 13 and to the cathode 15 through impedances 17 and through a plurality of windings 19 disposed on one arm 21 of a core 23 of magnetic material.

The core 23 is saturated by direct-current supplied to a section of windings 25 disposed on another arm 27 thereof and the electrical variations in accordance with which the system is to be operated are impressed in the form of pulsations in the saturating direct current. By reason of the pulsations the magnetic saturation of the core 23 is varied. Alternating current is supplied to the windings 29 disposed on a third arm 31 of the core 23.

It is seen that the variations provided for the operation of the system may be of any type that arises in the art and will depend on the use to which the system is put. Thus, for example, if it is desirable to translate energy from a given frequency to a predetermined frequency, the variations impressed on the windings of the core are of the predetermined frequency. These variations may be provided, for example, by a suitable power supply system (not shown) through a slip-ring (not shown) of proper character.

It is to be noted, of course, that the current in the windings 25 provided for impressing the variations on the control electrodes 11 are of such character as to vary the condition of the magnetic flux in the core 23, and consequently, to vary the induced voltages in the windings 19 that are connected to the control electrodes.

The midtap 33 of the secondary 7 of the power transformer 9 and the cathodes 15 of the electric-discharge devices 1 are connected across the one winding 35 of a reactor 37 through a resistor 39 of suitable character. Another winding 41 of the reactor 37 is in series with a load which is symbolically represented by a lamp 43.

The electric-discharge device 1 that is generally used in the practice of my invention is of the gas-filled type and is preferably equipped with a hot cathode, although in certain modifications of my invention, a mercury pool cathode is utilized. When the variations impressed on the core 23 of the controlling transformer are such that the control electrodes 11 attain the proper potential for discharge, the electric-discharge device across which a potential of proper polarity is impressed, becomes suddenly energized and an impulse is transmitted through the resistor 39 and through the winding 35 of the reactor 37.

The effect of the coaction of the impulse with the inductance 35 and the capacity normally inherent in the system is to produce high-frequency current variations. The peaks of these variations are considerably dulled by the resistor 39 in series with the winding 35 of the output reactor 37 and the variations are short-circuited away from the electric-discharge devices 1 by a network comprising a capacitor 45 and a resistor 47 connected across the winding 35 of the reactor 37. In this circuit, the variations are damped out, and, as a result of the effect of the circuit, the electric-discharge devices 1 continue to operate normally and are substantially not affected by the oscillations.

As has been explained hereinabove, my invention is particularly applicable to gas-filled electric-discharge devices of the hot cathode gas-filled and mercury pool type. It will be understood, of course, that my invention also has applicability to systems incorporating cold cathode gas-filled electric-discharge devices, or, in certain instances, it may even be applied to systems incorporating high-vacuum devices.

The apparatus shown in Fig. 2 is in many respects similar to the apparatus of the type shown in Fig. 1. In the latter apparatus, however, the controlling transformer is replaced by a saturated core reactor 49, the terminal windings 51 of which are fed from the source of alternating current 52. The variations in accordance with which the system is to be operated are fed in the form of direct current impulses to the central winding 53. The impulses produced in the terminal windings 51 of the saturated core reactor 49 are fed through the primary 57 of a transformer 59 of which the windings 19 may constitute the secondary.

It often happens that electric-discharge devices 1 utilized in a particular system may differ considerably in their characteristics and in their current output. For this reason and for the general purpose of varying the current output of electric-discharge devices, I have provided a system for shifting the phase of the electromotive force impressed between the cathodes 15 and the control electrodes 11 of the electric-discharge devices 1 relative to the phase of the electromotive force impressed between the anodes 3 and the cathodes 15.

The apparatus incorporating this particular feature of my invention is diagrammatically illustrated in Fig. 3. In general, the elements of the system shown in this figure are similar to the elements of the system shown in Figs. 1 and 2. However, the windings 19 connected between the control electrodes 11 and the cathodes 15 of the electric-discharge devices 1 through which the variations are supplied are shown as connected through a battery 61 of suitable magnitude whereby the control electrode is maintained at a potential properly cooperative with the characteristics of the electric-discharge devices.

The variations provided for the operation of the system are impressed across the windings of a potentiometer 63 that is equipped with a suitable movable tap 65. The movable tap 65 of the potentiometer is connected to one terminal 67 of the primary 69 of the transformer 70 whereby the controlling variations are provided for the control electrodes 11 and the other terminal 71 of the primary is connected to the junction point 73 of a capacitor 75 and a resistor 77. The resistor 77 and the capacitor 75 are, in turn, connected in series across the voltage divider 63. By varying the resistor 77 connected in series with the capacitor 75, the phase of the electromotive force impressed across the primary 69, and consequently the phase of the electromotive force impressed on the control electrodes 11, may be varied and thus the output current of the electric-discharge devices 1 may be varied.

In Fig. 4, the electromotive force impressed across the potentiometer is represented as a horizontal vector 79. The electromotive forces impressed across the resistor 77 and the capacitor 75 are represented as two vectors 81 and 83 extending from the terminals of the vector 79 representing the total electromotive force and at right angles to each other. The electromotive force impressed across the primary 69 of the transformer 70 is represented by a vector 85 extending from a point 87 on the vector 79, representing the total electromotive force, which corresponds to the point at which the variable tap 65 of the potentiometer 63 engages the windings thereof, and the intersection of the vectors 81 and 83 representing the electromotive forces impressed across the variable resistor 77 and the capacitor 75.

It is to be noted that the phase of the electromotive force impressed across the primary 69 of the control transformer 70 may be varied by varying the magnitude of the variable resistor 77. It will also be recognized that as the magnitude of the variable resistor varies, the intersection of the two vectors 81 and 83 at right angles to each other moves over the arc of a semi-circle 89 and may be represented, for example, by a series of points as shown in Fig. 4. If it is desired that the magnitude of the electromotive force impressed across the primary 69 of the control transformer 70 shall always remain constant, the variable tap 65 of the potentiometer 63 is disposed at the electrical center thereof. It will be noted that both variations in magnitude and in phase may be attained by shifting the variable tap of the potentiometer away from the electrical center.

In Fig. 5, a modified system is shown whereby the phase of the electromotive force impressed on the control electrodes 11 may be varied. The system may, if such a procedure is found desirable, replace the corresponding system shown in Fig. 3. In this view, the terminals A and B correspond to the terminals A and B of Fig 3.

The system shown in the view comprises a transformer 91, the primary 93 of which is supplied from an alternating current source of power. The secondary 95 of the transformer 91 is equipped with a plurality of taps 97 whereby the electromotive force impressed on the control electrodes 11 may be adjusted to any suitable value or phase displacement. The variable resistor 77 and the capacitor 75 incorporated in this system correspond to the same elements of the apparatus shown in Fig. 3.

The apparatus shown in Fig. 6 is the same as the apparatus shown in Fig. 5 in its application to my invention. In the system shown in the view, the multiple tap secondary 95 is replaced by the combination three-tap secondary 99 and a suitable potentiometer 101.

In the apparatus of the type shown in Fig. 7, the variable resistor 77 is replaced by an electric discharge device 103 which may be of the high-vacuum type and which provides an effective resistance responsive to the condition of its control circuit 105. A sensitive element 107 is disposed in its control circuit for varying the resistance.

Figure 8:
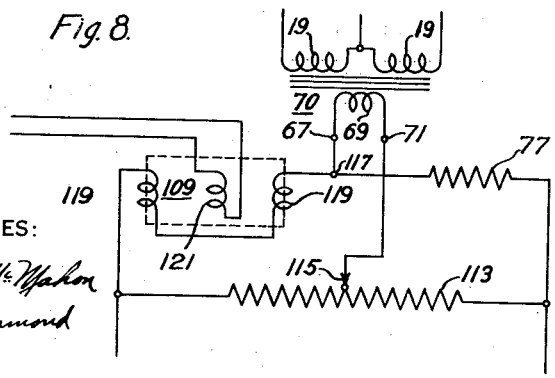

In the apparatus of the type shown in Fig. 8, the phase variation and also a magnitude variation is attained by utilizing a saturated core reactor 109 in one arm of the system whereby the electromotive force is supplied to the control electrode and a resistor 77 in the other arm of the system. Alternating voltage is impressed across the terminals of a potentiometer 113, the movable tap 115 of which is connected to one terminal 71 of the primary 69 of the control transformer 70, the junction point 117 of the resistor 77 and the terminal windings 119 of the saturated core reactor 109 being connected to the other terminal 67.

The variations in accordance with which the system is operated are impressed on the central windings 121 of the reactor. It will be noted that as the condition of saturation of the core is varied, the inductance of one arm of the system is varied and the consequent phase of the electromotive force impressed between the control electrodes 11 and cathodes 15 of the electric-discharge devices 1 is varied.

In the discussion given hereinbefore, I have shown a number of circuits embodying the essential elements of my invention. It is to be pointed out, however, that my invention may be practiced with a great variety of circuits and that my invention should consequently not be limited in its scope by the circuits actually shown.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for supplying power to an inductive load comprising an alternating power source, means coupled to said power source and said load for transmitting current impulses from said power source to said load during half-cycles of potential of said source that are of one polarity, an asymmetric electric discharge device having a plurality of principal electrodes and a control electrode, said device being of the type having an abrupt characteristic, means for so coupling the principal electrodes of said device to said power source and said load that current impulses are transmitted from said source to said load through said device during half-cycles of potential of said source that are of the opposite polarity, means for impressing potentials between said control electrode and said principal electrodes to determine the point in said last-named half-cycles at which said electric discharge device becomes energized to transmit said current impulses and means including a capacitor connected across the load for suppressing the influence of the high frequency potentials impressed by reason of the variation in current in said load, between the principal electrodes of said electric discharge device.

2. Apparatus for supplying power to an inductive load comprising an alternating power source, an asymmetric electric discharge device having a plurality of principal electrodes and a control electrode, said device being of the type having an abrupt characteristic, means for so coupling the principal electrodes of said device to said power source and said load that current impulses are transmitted from said source to said load through said device, means for impressing potentials between said control electrode and said principal electrodes to determine the point in the half-cycles of principal potential impressed on said electric discharge device at which said electric discharge device becomes energized to transmit said current impulses and means including a capacitor connected across the load for suppressing the influence of the high frequency potentials, impressed by reason of the variation in current in said load, between the principal electrodes of said electric discharge device.

3. Apparatus for supplying power to an inductive load comprising an alternating power source, means coupled to said power source and said load for transmitting current impulses from said power source to said load during half-cycles of potential of said source that are of one polarity, an asymmetric electric discharge device having a plurality of principal electrodes and a control electrode, said device being of the type having an abrupt characteristic, means for so coupling the principal electrodes of said device to said power source and said load that current impulses are transmitted from said source to said load through said device during half-cycles of potential of said source that are of the opposite polarity, means for impressing potentials between said control electrode and said principal electrodes to determine the point in said last-named half-cycles at which said electric discharge device becomes energized to transmit said current impulses and means including a capacitor and a resistor connected in series across the load for suppressing the influence of the high frequency potentials, impressed by reason of the variation in current in said load, between the principal electrodes of said electric discharge device.

4. Apparatus for supplying power to an inductive load comprising an alternating power source, an asymmetric electric discharge device having a plurality of principal electrodes and a control electrode, said device being of the type having an abrupt characteristic, means for so coupling the principal electrodes of said device to said power source and said load that current impulses are transmitted from said source to said load through said device, means for impressing potentials between said control electrode and said principal electrodes to determine the point in the half-cycles of principal potential impressed on said electric discharge device at which said electric discharge device becomes energized to transmit said current impulses and means including a capacitor and a resistor connected in series across the load, for suppressing the influence of the high frequency potentials impressed, by reason of the variation in current in said load, between the principal electrodes of said electric discharge device.

5. In energy translating apparatus of the type comprising an asymmetric electric discharge device having a control electrode and a plurality of principal electrodes, said device being of the type having an abrupt characteristic, means for impressing a potential between said principal electrodes, means for impressing potentials between said control electrode and said principal electrodes for controlling the excitation of said device and a load to be energized by the current transmitted by said device which load when so energized causes a high frequency potential to be superimposed on the potential impressed by said potential-impressing means between said principal electrodes whereby the excitation of said device is varied without regard to the potentials impressed between said control electrode and said principal electrodes; means, including a capacitor and a resistor connected in series shunting the load for suppressing the influence of said superimposed potential.

6. Apparatus for the control of the starting of an electric valve containing ionized gas or vapor and having a control electrode and a plurality of principle electrodes comprising a saturable reactor having a pair of windings, connections between one of said windings and the control electrode and one principal electrode of said valve, means for impressing a potential between said control electrode and said one principal electrode through said connections, and means for supplying sufficient current to the other of said windings to vary the saturation of said reactor and thereby to vary the potential impressed between said control electrode and said one principal electrode.

7. Apparatus for the control of the starting of an electric valve containing ionized gas or vapor and having a control electrode and a plurality of principal electrodes comprising a saturable reactor having a pair of windings, a network including one of said windings and a resistor, means for supplying alternating current to said network, connections between said network and the control electrode and a principal electrode of said valve and means for supplying direct current to the other of said windings.

8. Apparatus for the control of the starting of an electric valve containing ionized gas or vapor and having a control electrode and a plurality of principal electrodes comprising a saturable reactor having a pair of windings, a network including one of said windings and a resistor, means for supplying alternating current to said network, connections, including a transformer, between said network and the control electrode and a principal electrode of said valve and means for supplying direct current to the other of said windings.

9. Apparatus for the control of the starting of an electric valve containing ionized gas or vapor and having a control electrode and a plurality of principal electrodes comprising a saturable reactor having a pair of windings, a network including one of said windings and a resistor, means for supplying alternating current to said network, means for impressing the power output between the junction point of said one winding and said resistor and a point on said alternating current supply between the control electrode and a principal electrode of said valve, and means for supplying direct current to the other of said windings.

10. Apparatus for the control of the starting of an electric valve containing ionized gas or vapor and having a control electrode and a plurality of principal electrodes comprising a saturable reactor having a pair of windings, a network including one of said windings and a resistor, means for supplying alternating current to said network, connections, including a transformer, the primary of which is connected between the junction point of said one winding and said resistor and a point of said alternating-current supply, between said network and the control electrode and a principal electrode of said valve and means for supplying direct current to the other of said windings.

11. In combination, a source of alternating current, a load circuit for connection to said source, a reactor in series with said load circuit, said reactor having a control winding, a condenser connected in parallel with said control winding, an electronic tube having a grid and a plate, wires connecting said plate and said control winding in series with a source of alternating current, a resistor and a reactor connected in series across a source of alternating current, and a wire coupling said grid to the junction point of said resistor and said reactor.

12. In combination, alternating current supply lines, a lighting circuit connected to said supply lines, reactor means, said reactor means comprising coil means connected in series with said lighting circuit and control coil means magnetically coupled to said series coil means, a capacitor connected in parallel with said control coil means, a source of pulsating current connected to said control coil means to vary the impedance of said reactor means, said source including an electronic tube of the non-gaseous type having a cathode, a grid and an anode connected with circuits defining input and output circuits of said tube, sources of alternating currents energizing said input and output circuits, respectively, and means in the input circuit of said tube to vary the energization of said tube and thereby control current flow to said control coil.

13. In combination, a source of alternating current, a load circuit for connection to said source, a reactor in series with said load circuit, said reactor having a control winding, a condenser connected in parallel with said control winding, a tube having a grid and a plate, wires connecting said plate and said control winding in series with a source of alternating current, a resistor and a reactor connected in series across a source of alternating current, and a wire connecting said grid to the junction point of said resistor and said reactor.

STEPHAN P. SASHOFF.